(12) United States Patent
Layton

(10) Patent No.: US 10,017,018 B2
(45) Date of Patent: Jul. 10, 2018

(54) TRAILER HITCH LOCK FOR GOOSENECK TRAILERS

(71) Applicant: Joel P. Layton, Peoa, UT (US)

(72) Inventor: Joel P. Layton, Peoa, UT (US)

( * ) Notice: Subject to any disclaimer, the term of this patent is extended or adjusted under 35 U.S.C. 154(b) by 1 day.

(21) Appl. No.: 15/253,248

(22) Filed: Aug. 31, 2016

(65) Prior Publication Data

US 2017/0057311 A1     Mar. 2, 2017

Related U.S. Application Data

(60) Provisional application No. 62/213,436, filed on Sep. 2, 2015.

(51) Int. Cl.
| | | |
|---|---|---|
| *B60D 1/60* | (2006.01) | |
| *B60D 1/06* | (2006.01) | |
| *B60D 1/52* | (2006.01) | |
| *B62D 53/08* | (2006.01) | |

(52) U.S. Cl.
CPC ............. *B60D 1/60* (2013.01); *B60D 1/06* (2013.01); *B60D 1/52* (2013.01); *B60D 1/605* (2013.01); *B62D 53/085* (2013.01)

(58) Field of Classification Search
CPC . B60D 1/60; B60D 1/06; B60D 1/605; B60D 1/52; B62D 53/085
See application file for complete search history.

(56) References Cited

U.S. PATENT DOCUMENTS

| | | | | |
|---|---|---|---|---|
| 5,087,064 A | * | 2/1992 | Guhlin | ............... B60D 1/065 280/432 |
| 5,255,545 A | | 10/1993 | Wheeler | |
| 5,513,871 A | * | 5/1996 | Johnson | ............... B60D 1/60 280/507 |
| 5,520,030 A | | 5/1996 | Muldoon | |
| 402,602 A | | 12/1998 | Niswanger | |
| 6,109,078 A | * | 8/2000 | Marshall | ............... B60D 1/66 248/552 |
| 6,315,315 B1 | | 11/2001 | Scale | |
| 6,412,314 B1 | * | 7/2002 | Jenks | ............... B60D 1/065 280/507 |
| 6,880,368 B1 | * | 4/2005 | Ulbrich | ............... B60D 1/06 280/425.2 |
| 7,100,937 B2 | | 9/2006 | Hogan | |
| 7,121,121 B2 | | 10/2006 | Wyers | |
| 7,469,919 B2 | | 12/2008 | Kalous et al. | |
| 7,712,763 B2 | | 5/2010 | Lovenberg | |
| 8,117,873 B2 | | 2/2012 | Bickel, III | |
| 8,151,605 B1 | | 4/2012 | Gustafson | |
| D690,241 S | | 9/2013 | Gustafson | |
| 8,915,515 B1 | * | 12/2014 | Riibe | ............... B60D 1/488 280/504 |
| 9,254,723 B2 | * | 2/2016 | Ye | ............... B60D 1/065 |
| 2011/0088437 A1 | | 4/2011 | Cline | |
| 2013/0334793 A1 | * | 12/2013 | LaPrade | ............... B60D 1/06 280/511 |

* cited by examiner

*Primary Examiner* — Joseph M Rocca
*Assistant Examiner* — Marlon A Arce
(74) *Attorney, Agent, or Firm* — Geoffrey E. Dobbin; Dobbin IP Law P.C.

(57) ABSTRACT

A lock for a gooseneck style trailer may present a tow-ball interface on a base plate with an associated rod interface. The rod may be inserted through one of a plurality of holes along a circumference of the base plate so as to also interface with structure on the trailer. The rod then may be locked into position with a locking mechanism.

3 Claims, 4 Drawing Sheets

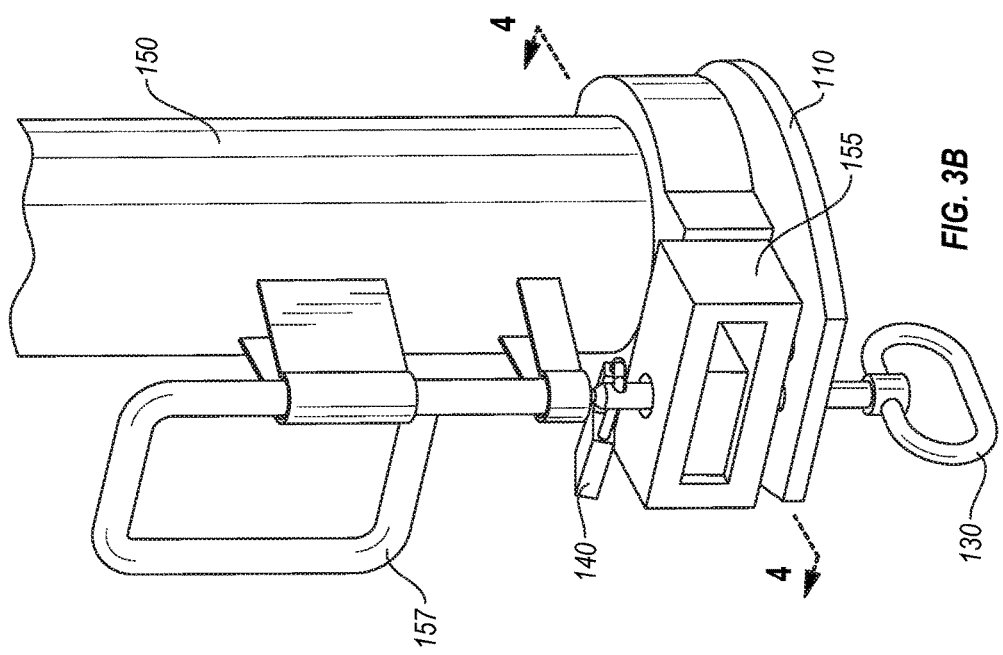
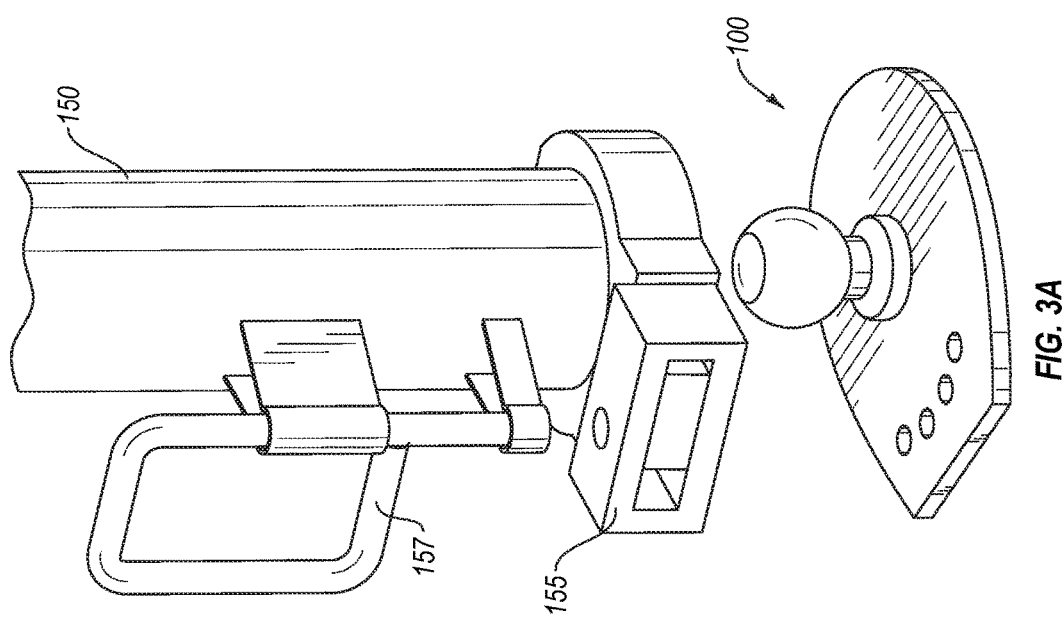

TRAILER HITCH LOCK FOR GOOSENECK TRAILERS

CROSS-REFERENCES TO RELATED APPLICATIONS

The present application claims priority as a non-provisional perfection of prior filed U.S. Application No. 62/213,436, filed Sep. 2, 2016, and incorporates the same by reference herein in its entirety.

FIELD OF THE INVENTION

The present invention relates to the field of locking devices and more particularly relates to a hitch lock for a gooseneck trailer.

BACKGROUND OF THE INVENTION

It is unfortunate that theft is an all too common occurrence in the human experience. Theft may involve any property which may be owned, whether large, small, tangible, or intangible. As a result, many safeguards have been made to protect the property of an individual. One of the oldest forms of protection is the lock. In its simplest form, a lock is a device or construction which either inhibits the natural use of an item or inhibits the ability to move an item. Locks have been used for centuries in the form of door locks and padlocks. The concepts behind locks are simple. If an object's use naturally requires motion, then lock it in a manner to prohibit that motion. If an object is naturally portable, then fasten and lock it to something immobile. If an object requires another object for use, prohibit that use by preventing the interface with a lock. The present invention is a lock of the latter category.

Trailers are a useful item in the portage of larger items. Various kinds of trailers are manufactured for various kinds of towing vehicles. Unfortunately, trailers are not immune from theft. If left unattended and unsecured, a thief merely has to have the right vehicle and hitch to fasten a trailer to the vehicle and steal it. Since a vehicle is usually necessary to move a trailer, locks for trailers often are of the type to inhibit the connection of the trailer and vehicle.

One type of trailer is commonly known as a "gooseneck" trailer. The hitch structure for a gooseneck trailer is usually comprised of a long appendage terminating in a throat. The appendage bends over a vehicle with a flat bed and positions its throat over the flat bed. A tow ball for attaching to the throat is located on the flat bed. The throat and tow ball then interface for primary connection. Gooseneck trailers tend to be bulky, so preventing the connection of the trailer's throat to a tow ball is a significant obstacle in attempting to steal the trailer. Such locks have been made in the past, however they have tended to be bulky, therefore difficult to install, and are prone to removal by cutting the lock. An ideal lock for a gooseneck trailer should be easily installed and difficult to remove unless authorized. In an effort to hinder removal, as little of the lock must be exposed for cutting or other damage that would facilitate unauthorized removal.

SUMMARY OF THE INVENTION

In view of the foregoing disadvantages inherent in the known types of trailer locks, this invention provides a trailer hitch lock that is easily installed and difficult to remove unless authorized to be removed. To accomplish these objectives, the trailer hitch lock may comprise a tow ball structure mounted upon a base plate. The base plate may have a plurality of holes drilled along an edge of the plate for a lock pin. The lock pin may then be used to interface with structure of the trailer. With such a construction, the plate with the tow ball structure may be inserted into the throat of the goose neck and held in place while the lock is further secured.

The more important features of the invention have thus been outlined in order that the more detailed description that follows may be better understood and in order that the present contribution to the art may better be appreciated. Additional features of the invention will be described hereinafter and will form the subject matter of the claims that follow.

Many objects of this invention will appear from the following description and appended claims, reference being made to the accompanying drawings forming a part of this specification wherein like reference characters designate corresponding parts in the several views.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 3a is a perspective view of the lock of FIG. 1 about to interface with a trailer's throat.

FIG. 3b is a perspective view of the lock of FIG. 3a, assembled about a trailer throat.

DETAILED DESCRIPTION OF THE PREFERRED EMBODIMENT

With reference now to the drawings, the preferred embodiment of the trailer lock is herein described. It should be noted that the articles "a," "an," and "the," as used in this specification, include plural referents unless the content clearly dictates otherwise.

Figure 1:
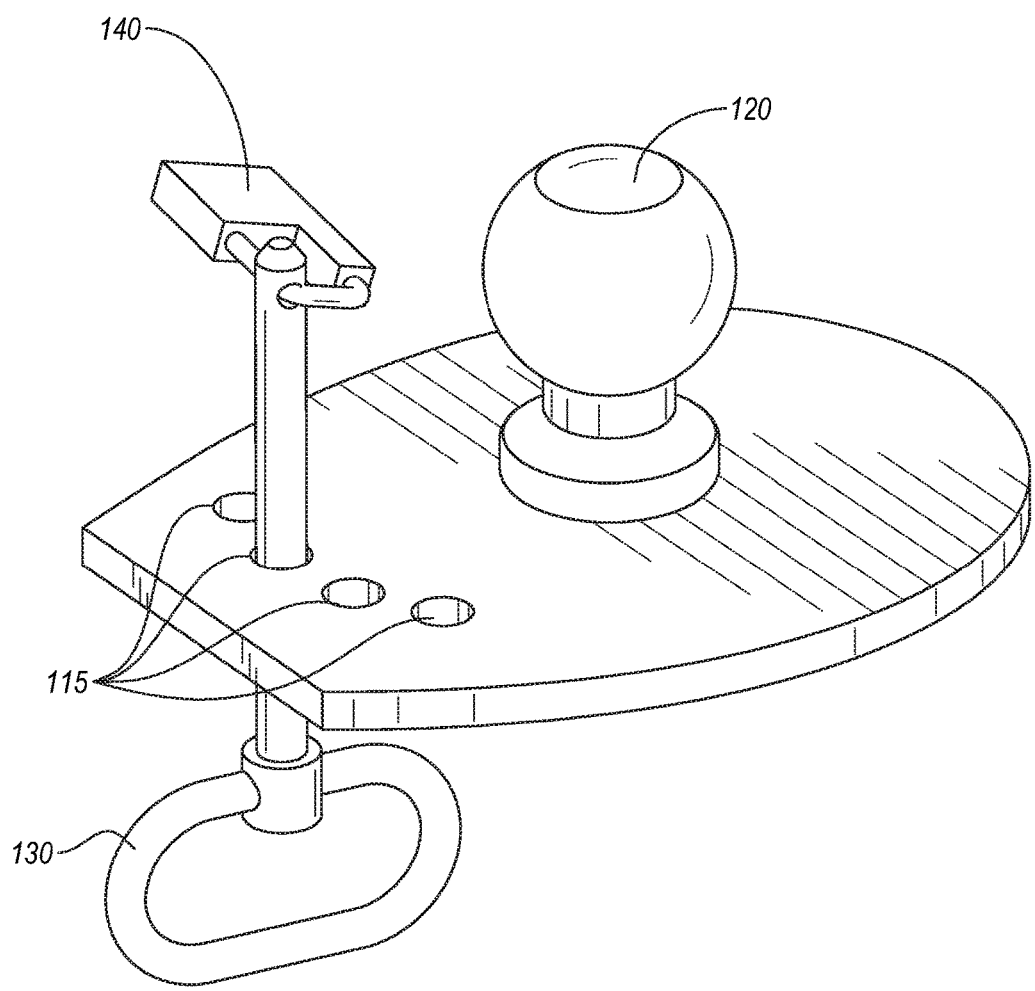
FIG. 1 is a perspective view of components for one embodiment of a trailer lock according to the present invention.
Figure 2:
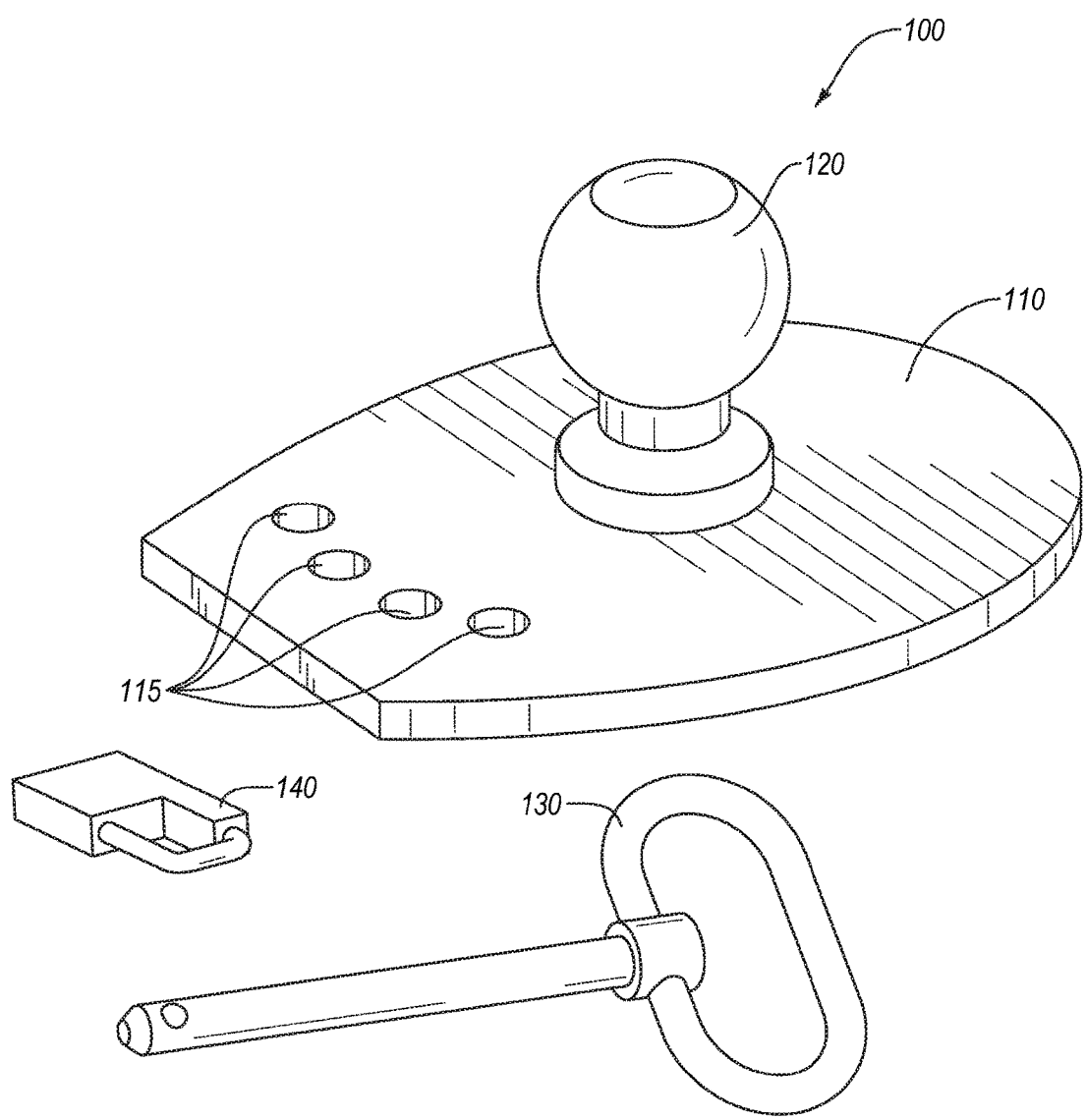
FIG. 2 is a perspective view of the components of FIG. 1, assembled.

With reference to FIG. 1, one embodiment of a lock 100 features a tow ball structure 120 mounted generally centrally on a metal base plate 110. Base plate 110 is generally round but has one side that is more pronounced. This side may present at least one, but possibly a plurality of interface holes 115. If 10 a plurality of interface holes 115 are present, each one may be a different distance from the center of the tow ball structure 120. In this manner, the lock 100 may be fitted to different models of trailers. It is of course also possible to custom drill an interface hole. A rod or lock pin 130 may then be inserted through an appropriate interface hole 115 and secured with a padlock 140 or 15 some other similar device (FIG. 2). While other devices may be used instead of a padlock 140, this Specification will continue to use the term "padlock" and this term should not be seen as limiting.

In use, shown in FIGS. 3a and 3b, the base plate 110 with the tow ball structure 120 may then be presented to the throat of a trailer hitching structure 150. Such structures usually have, attachment mechanism comprising a securement handle 157 which interfaces with a movable block 155 and the remaining hitch structure on a towing vehicle. Normally, the movable block 155 moves to accommodate the tow ball's insertion and moves back into place to secure it. The securement handle 157, then is inserted into a hole in the movable block 155 to hold it in place.

Figure 4:
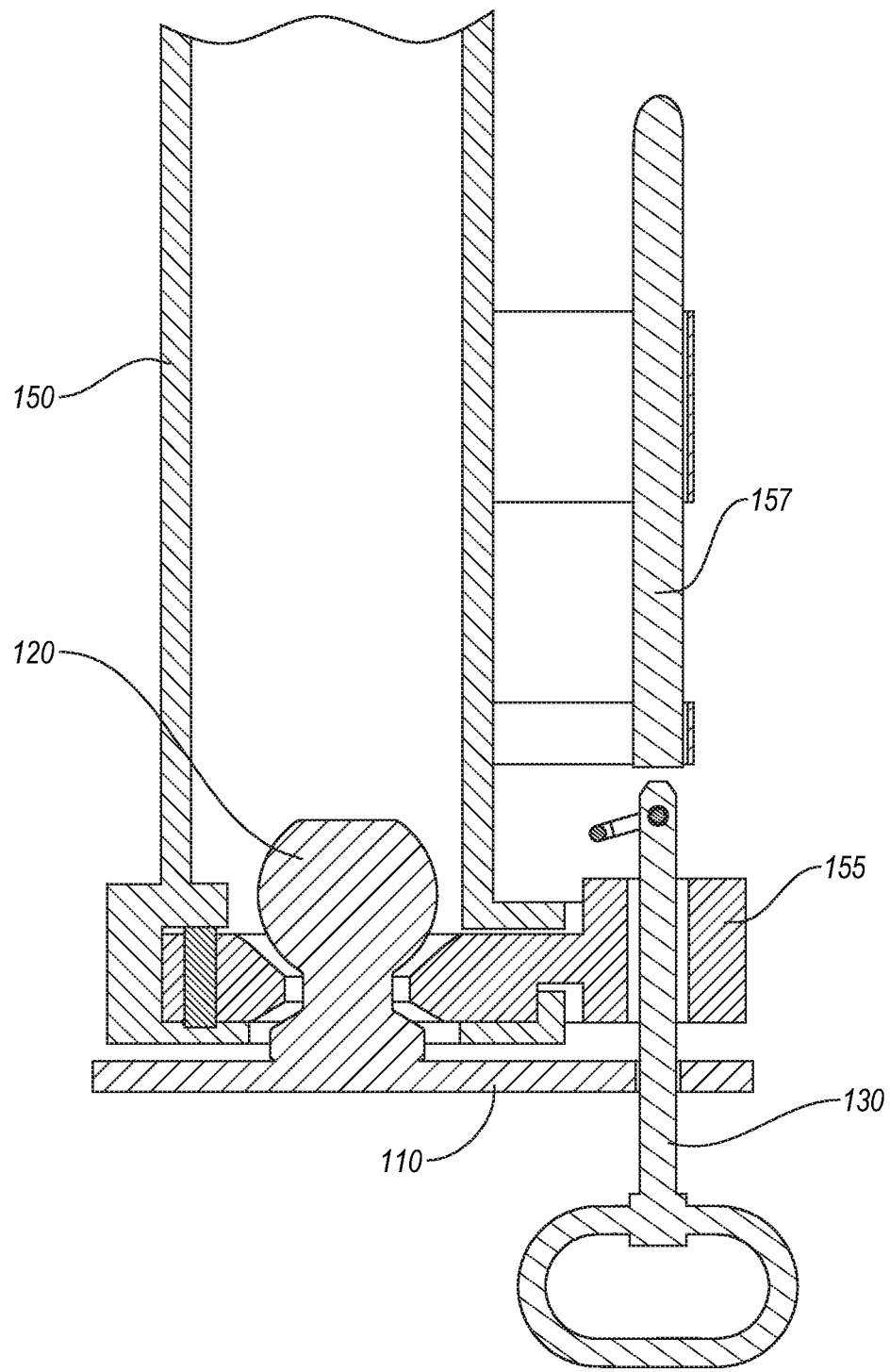
FIG. 4 is a sectional view of the lock and throat of FIG. 3a, taken along line 4.

The tow ball structure 120 is inserted into the throat (FIG. 4) and is held in place by the block 155. At this point, a user's hands are both free to manipulate the remaining components of the lock 100. Lock pin 130 is inserted through an appropriate interface hole 115 and the hole in the block 155 and secured by padlock 140. Lock pin 130 may be of any length, so long as it may pass though both the base plate 110 and block 155 and still be secured. In the event that the lock pin 130 is cut, the position of the lock pin and the lock 140 within the securement structure of the hitch's latching mechanism still prevents removal. By proper placement of the padlock 140, access to it for cutting is also difficult. Positioning of the base plate 110 close to the block 155 prevents access to the lock pin 130 between these structures.

Although the present invention has been described with reference to preferred embodiments, numerous modifications and variations can be made and still the result will come within the scope of the invention. No limitation with respect to the specific embodiments disclosed herein is intended or should be inferred.

What is claimed is:

1. A trailer lock for a gooseneck trailer, the gooseneck trailer having a neck containing a throat in a distal end and latching structure above the throat on the neck, the trailer lock comprising:
   a. a planar base plate having a perimeter and a center;
   b. at least one interface hole in the planar base plate, proximate the perimeter;
   c. a hitch ball mounted proximate the center of the base plate;
   d. a lock rod having a block on one end and an interface for a lock on another end;
   wherein the hitch ball is inserted within the throat of the gooseneck trailer and the lock rod through at least one interface hole in a manner to extend into the latching structure of the gooseneck trailer whereupon it may then be locked in position, thus arresting movement of the latching structure and securing the base plate against the gooseneck trailer.

2. The trailer lock of claim 1, further comprising a plurality of interface holes, selectable dependent upon the fit of the trailer lock with the gooseneck trailer.

3. The trailer lock of claim 2, the plurality of interface holes each having unique distances from the hitch ball.

* * * * *